(No Model.)

F. ANKER.
PRESERVING FOOD COMPOUNDS.

No. 521,694.　　　　　　　　Patented June 19, 1894.

Witnesses,　　　　　　　　Inventor.
Robert Pratt.　　　　　　　Fannie Anker.
Thos. A. Green　　　　　　By James L. Norris.
　　　　　　　　　　　　　　　Atty.

UNITED STATES PATENT OFFICE.

FANNIE ANKER, OF JERSEY CITY, NEW JERSEY.

PRESERVING FOOD COMPOUNDS.

SPECIFICATION forming part of Letters Patent No. 521,694, dated June 19, 1894.

Application filed April 28, 1894. Serial No. 509,338. (No specimens.)

*To all whom it may concern:*

Be it known that I, FANNIE ANKER, a citizen of the United States, residing at Jersey City, in the county of Hudson and State of New Jersey, have invented new and useful Improvements in Capsuling Compressed Food Products, of which the following is a specification.

This invention relates to food products, and has for its object to provide a new and improved process or method of preparing and preserving food compounds.

The invention consists in thoroughly blending a meat extract with vegetable matter, sauces and condiments, then pressing the cold compound through a lengthened tube and into a capsule on the exit end of said tube, gradually forcing off the capsule by the pressure of the compound filling the same, then cutting off the compound at or near the end of the filled capsule and finally closing the capsule.

Figure 1:
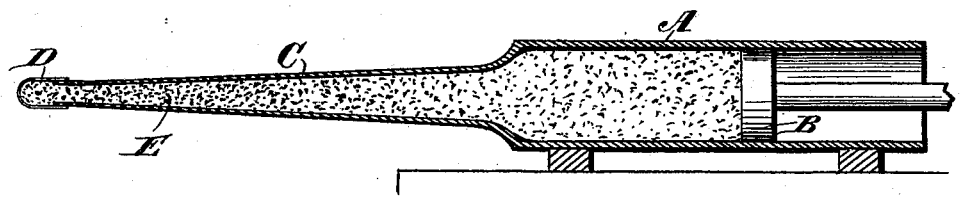
Figure 2:
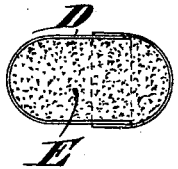

In the accompanying drawings—Figure 1 is a longitudinal sectional view of a portion of an apparatus suitable for carrying my invention into effect. Fig. 2 is a longitudinal section of a filled and closed capsule with the food compound compressed therein.

In the preparation of my improved capsuled food compound I may take any suitable extract of beef, such as Liebig's, or any of the well known extracts of meat, fish or vegetables, or a mixture of these, in the form of a paste. The meat extract should be semi-solid and of the best quality. I mix the meat extract with suitable vegetable matter, preferably celery, and with choice sauces and condiments, such as pepper and salt, or with any desired flavoring or spices. The sauces and condiments should be in such proportions that no further flavoring will be needed when the compound is applied to its intended use. These ingredients are blended or incorporated with each other by thoroughly mixing and kneading them together in a suitable vessel until the compound is brought to a soft and plastic condition and made of uniform quality throughout. If the operation of mixing and blending the ingredients is carried on in cold weather, a moderate heat may be employed such as will be obtained by placing the mixer on or above a receptacle for hot water, or in warm weather the mixer may rest on a box or chamber containing ice. No special mixing apparatus is necessary, but care should be taken that all the ingredients of the food compound are thoroughly and evenly incorporated with each other. After the compound has been thus carefully prepared it is placed, in a cold and semi-solid condition, into a cylinder, such as A, fitted with a plunger B and having a lengthened tube C projecting from one end. The tube C is preferably tapered toward its exit end and may be five or six feet in length, more or less. The plunger B may be operated by any suitable or convenient power mechanism. A capsule D, composed of gelatine or similar soluble and harmless material, is placed onto the exit end of the tube C and, by the action of the plunger B, the food compound in the cylinder A is compressed and forced continuously through the tube C and into the capsule. In passing through the tapering tube C, under the forcing action of the plunger, the food compound becomes condensed and in that condition, it enters the capsule. The pressure exerted on and throughout the compound causes it to fill the capsule compactly and gradually forces it off from the exit end of the tube. By means of a suitable knife the column of semi-solid or pasty compound E is then severed at or near the end of the filled capsule, another empty capsule is immediately placed on the tube and the filled capsule is at once closed by pressing onto it its companion member or closing half, in the usual manner of sealing up capsules. The filled capsules may be packed in boxes for the trade. Each capsule will contain a sufficient quantity of the compressed food compound to make a cup of bouillon or soup. The capsules should be kept in a dry and cool place, but otherwise require no special care for their preservation and they will remain wholesome and nutritious in all climates and for a long time. When required for use a single capsule may be dissolved in a cup of water, either hot or cold, as preferred, and will furnish a palatable and nutritious article of food.

The capsules are tonic as well as nourishing for the healthy or the convalescent and are particularly well adapted for hospital use in the army and navy, as well as by travelers. They are also useful in the practice of physicians and for domestic purposes generally.

What I claim as my invention is—

The herein described process of preparing and preserving a food compound, which consists in thoroughly blending a meat extract with vegetable matter, sauces and condiments, then pressing the cold compound through a lengthened tube and into a capsule on the exit end of said tube, gradually forcing off the capsule by the pressure of the compound filling the same, then cutting off the compound at or near the end of the filled capsule and finally closing the capsule, substantially as set forth.

In testimony whereof I have hereunto set my hand and affixed my seal in presence of two subscribing witnesses.

FANNIE ANKER. [L. S.]

Witnesses:
DAVID MAYER,
RALPH COHEN.